(12) United States Patent
Tanabe

(10) Patent No.: US 11,659,275 B2
(45) Date of Patent: May 23, 2023

(54) INFORMATION PROCESSING APPARATUS THAT PERFORMS ARITHMETIC PROCESSING OF NEURAL NETWORK, AND IMAGE PICKUP APPARATUS, CONTROL METHOD, AND STORAGE MEDIUM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/848,656

(22) Filed: Jun. 24, 2022

(65) Prior Publication Data

US 2022/0321783 A1 Oct. 6, 2022

Related U.S. Application Data

(62) Division of application No. 16/934,130, filed on Jul. 21, 2020, now Pat. No. 11,496,682.

(30) Foreign Application Priority Data

Jul. 29, 2019 (JP) .............................. JP2019-138934

(51) Int. Cl.
*H04N 23/667* (2023.01)
*G06N 3/04* (2023.01)
(Continued)

(52) U.S. Cl.
CPC ............. *H04N 23/667* (2023.01); *G06N 3/04* (2013.01); *G06N 3/045* (2023.01);
(Continued)

(58) Field of Classification Search
CPC ........... H04N 5/23245; H04N 5/23229; H04N 5/232933; H04N 5/232941; H04N 5/232;
(Continued)

(56) References Cited

U.S. PATENT DOCUMENTS 4,965,443 A 10/1990 Yamasaki
2005/0093989 A1 5/2005 Imai
(Continued)

FOREIGN PATENT DOCUMENTS

CN 101340522 A 1/2009
CN 109344715 A 2/2019
(Continued)

OTHER PUBLICATIONS

Notice of Allowance issued in U.S. Appl. No. 16/934,130 dated Jul. 13, 2022.
(Continued)

*Primary Examiner* — Timothy J Henn
(74) *Attorney, Agent, or Firm* — Rossi, Kimms & McDowell LLP

(57) ABSTRACT

An information processing apparatus includes a processor that performs arithmetic processing of a neural network, and a controller that is capable of setting, in the processor, a first inference parameter to be applied to processing for shooting control for shooting an image and a second inference parameter to be applied to processing for processing control of the image. The controller switches the first inference parameter having been set in the processor to the second inference parameter in response to settlement of a focus target.

7 Claims, 11 Drawing Sheets

(51) Int. Cl.
  *G06N 3/045* (2023.01)
  *H04N 23/80* (2023.01)
  *H04N 23/63* (2023.01)

(52) U.S. Cl.
  CPC ......... *H04N 23/631* (2023.01); *H04N 23/634* (2023.01); *H04N 23/80* (2023.01)

(58) Field of Classification Search
  CPC .......... H04N 5/23212; H04N 5/23218; H04N 5/232935; H04N 5/23216; H04N 23/667; H04N 23/631; H04N 23/634; H04N 23/80; H04N 23/60; H04N 23/67; H04N 23/61; H04N 23/632; H04N 23/62; G06N 3/04; G06N 3/0454; G06N 3/063; G06N 3/02; G06N 3/045; G03B 3/00
  See application file for complete search history.

(56) References Cited

U.S. PATENT DOCUMENTS

| | | | |
|---|---|---|---|
| 2005/0232482 A1 | 10/2005 | Ikeda et al. | |
| 2009/0009652 A1 | 1/2009 | Sudo et al. | |
| 2019/0199917 A1 | 6/2019 | Kadoi | |
| 2019/0260924 A1* | 8/2019 | Sudo | H04N 5/23222 |
| 2019/0387175 A1 | 12/2019 | Kikuchi | |
| 2020/0412942 A1 | 12/2020 | Chen et al. | |

FOREIGN PATENT DOCUMENTS

| | | |
|---|---|---|
| CN | 109981976 A | 7/2019 |
| EP | 3410392 A1 | 12/2018 |
| JP | H04346580 A | 12/1992 |
| JP | 2005064650 A | 3/2005 |
| JP | 2005202562 A | 7/2005 |
| JP | 2008060989 A | 3/2008 |
| JP | 2009078069 A | 4/2009 |

OTHER PUBLICATIONS

Combined Search and Examination Report issued in GB Appln. No. 2011198.5 dated Mar. 31, 2021.

Office Action issued in U.S. Appl. No. 16/934,130 dated Mar. 28, 2022.

Office Action issued in Chinese Appln. No. 202010738818.9 dated Sep. 5, 2022. English translation provided.

* cited by examiner

INFORMATION PROCESSING APPARATUS THAT PERFORMS ARITHMETIC PROCESSING OF NEURAL NETWORK, AND IMAGE PICKUP APPARATUS, CONTROL METHOD, AND STORAGE MEDIUM

BACKGROUND OF THE INVENTION

Field of the Invention

The present invention relates to an information processing apparatus that performs arithmetic processing of a neural network, an image pickup apparatus, a control method, and a storage medium.

Description of the Related Art

An image pickup apparatus such as a digital camera performs processing such as identification of a shot image. In such a case, it is conceivable that the image pickup apparatus performs processing such as identification of a shot image using a neural network. As a related technology, an endoscopic system disclosed in Japanese Laid-Open Patent Publication (kokai) No. 2009-78069 has been proposed. In the endoscopic system of Japanese Laid-Open Patent Publication (kokai) No. 2009-78069, command data concerning dynamic dictionary updating is transmitted to a capsule type endoscope, and the capsule type endoscope updates the dynamic dictionary stored in a RAM based on the command data.

In general, since the processing of the neural network executes a large number of multiply-accumulate operations, a dedicated circuit equipped with a multiply-accumulate operation circuit is used. Here, when processing of a plurality of neural networks is performed for a picked up image, it is required to efficiently use the dedicated circuit that performs the processing of the neural network. The endoscopic system of Japanese Laid-Open Patent Publication (kokai) No. 2009-78069 updates the dynamic dictionary based on command data, but it does not efficiently use a dedicated circuit that performs the processing of the neural network.

SUMMARY OF THE INVENTION

The present invention provides efficient switching of a neural network applied to an image.

Accordingly, the present invention provides an information processing apparatus including a processor that performs arithmetic processing of a neural network, and a controller that is capable of setting, in the processor, a first inference parameter to be applied to processing for shooting control for shooting an image and a second inference parameter to be applied to processing for processing control of the image, wherein the controller switches the first inference parameter having been set in the processor to the second inference parameter in response to settlement of a focus target.

According to the present invention, the neural network applied to the image can be efficiently switched.

Further features of the present invention will become apparent from the following description of exemplary embodiments (with reference to the attached drawings).

DESCRIPTION OF THE EMBODIMENTS

First Embodiment

Figure 1:
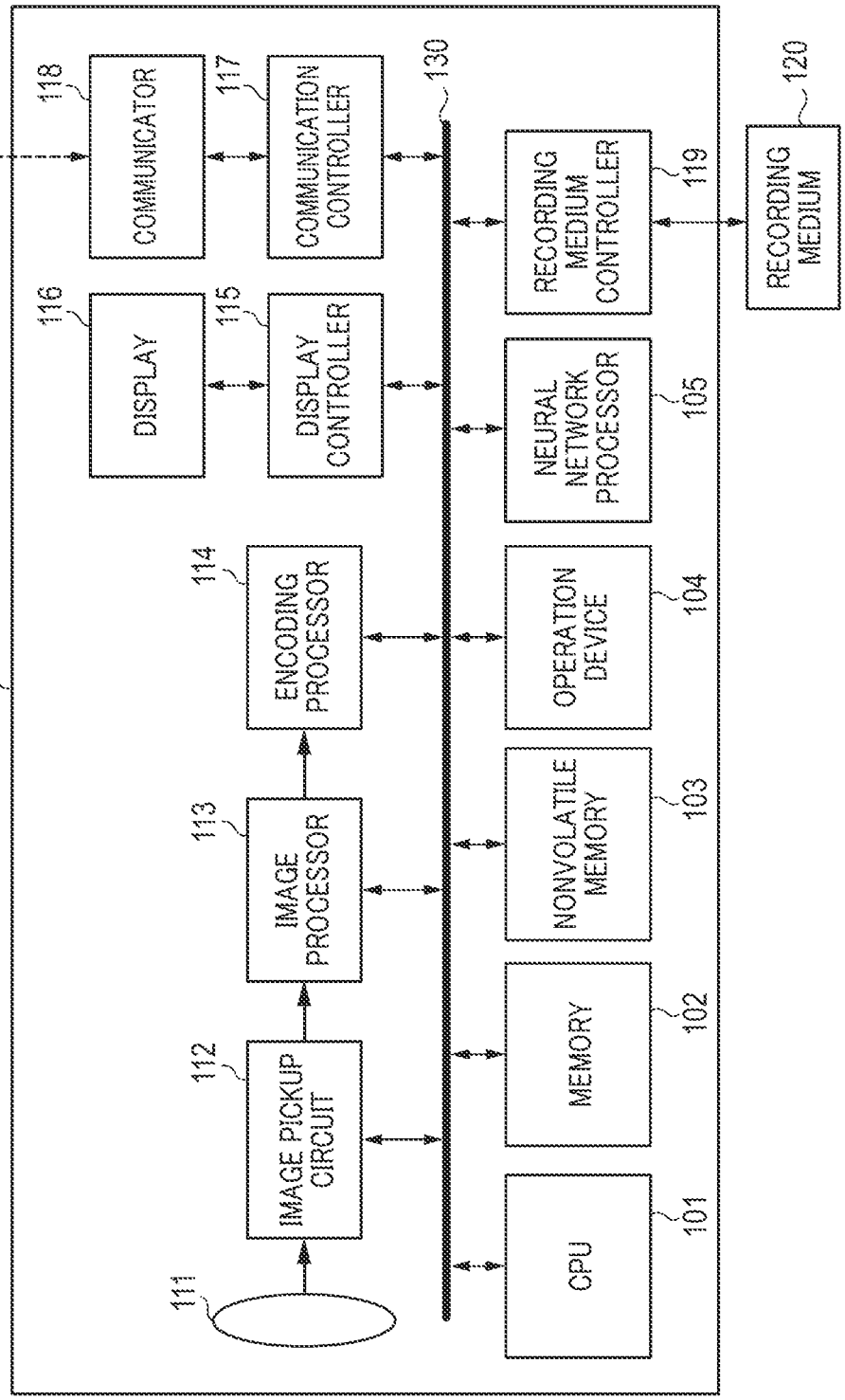
FIG. 1 is a block diagram showing an image pickup apparatus.

FIG. 1 is a block diagram showing an image pickup apparatus 100. The image pickup apparatus 100 has a CPU 101, a memory 102, a nonvolatile memory 103, an operation device 104, and a neural network processor 105. The image pickup apparatus 100 further has a taking lens 111, an image pickup circuit 112, an image processor 113, an encoding processor 114, a display controller 115, and a display 116. The image pickup apparatus 100 further has a communication controller 117, a communicator 118, a recording medium controller 119, and an internal bus 130. The image pickup apparatus 100 forms an optical image of a subject on a pixel array of the image pickup circuit 112 by using the taking lens 111. The taking lens 111 may be removable or may be non-removable from the body (case or main body) of the image pickup apparatus 100. The image pickup apparatus 100 writes and reads image data to and from a recording medium 120 via the recording medium controller 119. The recording medium 120 also may be removable or may be non-removable from the image pickup apparatus 100.

The CPU 101 (first CPU) controls the operation of each part of the image pickup apparatus 100 via the internal bus 130 by executing a computer program stored in the nonvolatile memory 103. The CPU 101 corresponds to the controller or a first processor. The memory 102 is a rewritable volatile memory. The memory 102 temporarily stores information such as a computer program for controlling the operation of each part of the image pickup apparatus 100 and parameters related to the operation of each part of the image pickup apparatus 100, information received by the communication controller 117, and the like. In addition, the memory 102 temporarily stores an image (image data) acquired by the image pickup circuit 112, or an image and information processed by the image processor 113, the encoding processor 114, or the like. The memory 102 has a storage capacity for storing various types of information. The memory 102 stores information used by the neural network processor 105. The information used by the neural network processor 105 includes a computer program describing the processing contents of the neural network and a machine learned coefficient parameter (weight coefficient, bias value, and the like). The weight coefficient is a value indicating the strength of connection between nodes in the neural network.

The bias is a value giving an offset to the integrated value of the weight coefficient and input data. The value of the machine learned coefficient parameter is adjusted by machine learning for the neural network.

The nonvolatile memory 103 is a memory capable of electrically erasing and storing. For example, an EEPROM, a hard disk, or the like is used as the nonvolatile memory 103. The nonvolatile memory 103 stores information such as a computer program executed by the CPU 101 and parameters related to the operation of each part of the image pickup apparatus 100. When the CPU 101 executes a computer program, various operations performed by the image pickup apparatus 100 are implemented. The information used by the neural network described above may be stored in the nonvolatile memory 103.

The operation device 104 is provided for the user to operate the image pickup apparatus 100. The operation device 104 includes various buttons such as a power button, a menu button, a release button for shooting, a moving image recording button, and a cancel button. The various buttons can be constituted by a switch, a touch screen, and the like. The CPU 101 controls the image pickup apparatus 100 in accordance with an instruction from the user that is input via the operation device 104. The CPU 101 may control the image pickup apparatus 100 based on a request that is input from, for example, a remote controller or a mobile terminal via the communicator 118. The neural network processor 105 will be described later.

The taking lens 111 is a lens element that is configured to include a lens group, a lens controller, and a diaphragm. The lens group includes a zoom lens and a focus lens. The taking lens 111 can function as a zoom lens that changes the angle of view. The lens controller adjusts the focus and controls the aperture value (F-value) in accordance with the control signal transmitted by the CPU 101. The image pickup circuit 112 sequentially acquires a plurality of images constituting a moving image. For example, an area image sensor such as a charge-coupled device (CCD) or complementary metal oxide semiconductor (CMOS) device is applied to the image pickup circuit 112. The image pickup circuit 112 has a pixel array in which photoelectric converters (not shown) that convert an optical image of the subject into an electric signal are arranged in a matrix, i.e., two-dimensionally. An optical image of the subject is formed on the pixel array from the taking lens 111. The image pickup circuit 112 outputs the picked up image to the image processor 113 or the memory 102. The image pickup circuit 112 can also acquire an image as a still image.

The image processor 113 performs predetermined image processing on the image data having been output from the image pickup circuit 112 or the image data having been read from the memory 102. As the image processing, dynamic range conversion processing, interpolation processing, reduction processing (resizing processing), color conversion processing, and the like can be applied. In addition, the image processor 113 performs predetermined arithmetic processing for performing exposure control, distance measurement control, and the like using the image acquired by the image pickup circuit 112. The CPU 101 performs exposure control, distance measurement control, and the like based on the result of arithmetic processing performed by the image processor 113. For example, the CPU 101 performs automatic exposure (AE) processing, auto white balance (AWB) processing, autofocus (AF) processing, and the like.

The encoding processor 114 performs intra-frame predictive encoding (in-screen predictive encoding), inter-frame predictive encoding (inter-screen predictive encoding), and the like on the image data. Thus, the size of the image data is compressed. The encoding processor 114 may be, for example, an encoding apparatus configured by a semiconductor device or the like. In addition, the encoding processor 114 may be an encoding apparatus provided outside the image pickup apparatus 100, and the image pickup apparatus 100 may acquire encoded image data from an external encoding apparatus.

The display controller 115 controls the display 116. The display controller 115 is implemented by a GPU, for example. The display controller 115 generates an image displayable on the display screen of the display 116, and outputs the generated image as an image signal to the display 116. In addition, the display controller 115 can not only output the image data to the display 116 but also output the image data to an external device 217 via the communication controller 117. The display 116 displays an image on the display screen based on the image signal sent from the display controller 115. The display 116 has an on-screen display (OSD) function, which is a function to display a setting screen such as a menu on the display screen. The display controller 115 can output an image signal to the display 116 with an OSD image superimposed on the image signal. The display 116 is constituted by a liquid crystal display, an organic EL display, or the like, and displays an image signal sent from the display controller 115. The display 116 may also be a touch screen display, for example. In the case where the display 116 is a touch screen display, the display 116 also has the function of the operation device 104.

The communication controller 117 is controlled by the CPU 101. The communication controller 117 controls the communicator 118. The communication controller 117 transmits a video signal conforming to a communication standard such as High Definition Multimedia Interface (HDMI) (registered trade mark) or Serial Digital Interface (SDI). In addition, the communicator 118 is also capable of transmitting and receiving control signals other than video signals. The communicator 118 converts video signals and control signals into physical electrical signals, and transmits and receives them to and from the external device 217. The communication controller 117 may generate a modulation signal conforming to a predetermined wireless communication standard, and transmit the modulation signal from the communicator 118. In addition, the communication controller 117 may also acquire a modulation signal from the external device 217 received by the communicator 118.

The recording medium controller 119 controls the recording medium 120. The recording medium controller 119 outputs a control signal for controlling the recording medium 120 to the recording medium 120 based on a request from the CPU 101. As the recording medium 120, for example, a nonvolatile memory, a magnetic disk, a semiconductor memory, or the like is applied. The recording medium 120 stores encoded image data and the like. In the recording medium 120, image data and the like are saved as files in a form conforming to the file system of the recording medium 120. Each part such as the CPU 101 and the neural network processor 105 are mutually accessible via the internal bus 130.

Figure 2:
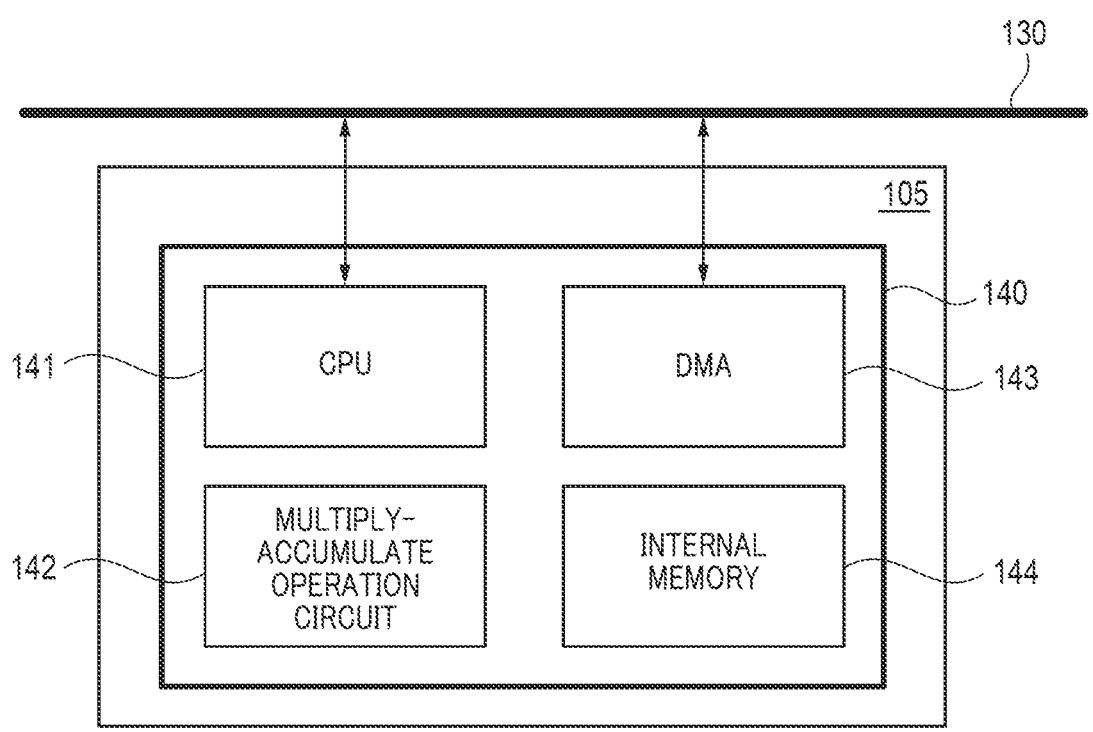
FIG. 2 is a diagram showing a configuration of a neural network processor according to a first embodiment.

FIG. 2 is a diagram showing the configuration of the neural network processor 105. The neural network processor 105 is built by a neural core 140 as a processor or a second processor. The neural core 140 performs inference processing by performing arithmetic processing using coefficient parameters learned in advance. The neural network (neural network system) of each embodiment will be described as being a convolutional neural network (CNN). However, a neural network other than the CNN may be applied. As the CNN, for example, a layer structure in which a convolution layer and a pooling layer are alternately laminated and a fully connected layer is connected to an output side can be adopted. The machine learned coefficient parameter described above corresponds to the weight or bias possessed by the respective edges connecting between the nodes of each layer in the fully connected layer. In addition, the machine learned coefficient parameter corresponds to the weight or bias of the kernel (filter) in each layer of the preceding stage of the fully connected layer.

The neural core 140 is a dedicated circuit for performing the processing of a neural network, for example. The neural core 140 has a CPU 141, a multiply-accumulate operation circuit 142, a DMA 143, and an internal memory 144. The CPU 141 (second CPU) is a CPU different from the CPU 101 in FIG. 1. The CPU 141 executes a computer program in which the processing contents of the neural network are described. The computer program may be read by the CPU 141 from the memory 102 or the nonvolatile memory 103 via the internal bus 130, or may be read from the internal memory 144. In addition, the CPU 141 also controls the multiply-accumulate operation circuit 142 and the DMA 143.

The multiply-accumulate operation circuit 142 is a circuit that performs a multiply-accumulate operation in the processing of the neural network. The multiply-accumulate operation circuit 142 is constituted by a plurality of multiply-accumulate operation circuits, and each multiply-accumulate operation circuit can execute arithmetic processing in parallel. The DMA 143 is a circuit that performs data transfer not via the CPU 141. The DMA 143 performs data transfer control between the memory 102 or the nonvolatile memory 103 and the internal memory 144 via the internal bus 130. The DMA 143 also performs data transfer control between the multiply-accumulate operation circuit 142 and the internal memory 144. The data transferred by the DMA 143 includes a computer program describing the processing contents of the neural network, a machine learned coefficient parameter, and intermediate data calculated by the multiply-accumulate operation circuit 142.

The internal memory 144 stores a computer program describing the processing contents of the neural network, a machine learned coefficient parameter, intermediate data calculated by the multiply-accumulate operation circuit 142, and the like. In addition, the internal memory 144 may have a plurality of banks. In this case, each bank can be switched dynamically.

Next, a normal operation performed by the image pickup apparatus 100 of the present embodiment will be described. For example, when the user operates the power button of the operation device 104, the operation device 104 outputs a start instruction to the CPU 101 based on the operation. Upon receiving the instruction, the CPU 101 controls the power supplier to supply power to each block of the image pickup apparatus 100. When power is supplied to each block, the CPU 101 confirms the mode switching switch of the operation device 104, for example. The mode of the present embodiment includes a still image shooting mode, a continuous shooting mode, a moving image shooting mode, and a reproduction mode. The mode switching switch is a switch for setting any of the modes. The user can switch to any of the four modes by switching the mode switching switch. The switchable mode is not limited to the four modes described above. Based on the instruction signal from the operation device 104, the CPU 101 confirms the mode set by the mode switching switch.

The normal still image shooting mode will be described. When the user half presses the release button of the operation device 104 in a shooting standby state, the image pickup apparatus 100 is brought into focus. When the user then fully presses the release button of the operation device 104, the image pickup apparatus 100 performs recording processing of the still image having been shot. In the recording processing, the image processor 113 performs image processing on the image data of the still image shot by the image pickup circuit 112. Then, the encoding processor 114 performs encoding processing on the image data having been subjected to the image processing, and the recording medium controller 119 records the encoded image data in the recording medium 120 as an image file.

In the present embodiment, the image pickup apparatus 100 has a function of continuously shooting still images. When the user sets the shooting mode that performs continuous shooting by using the operation device 104, the continuous shooting function becomes enabled. Information indicating whether the continuous shooting function is enabled or disabled is stored in the memory 102. The image pickup apparatus 100 continuously shoots still images while the release button is fully pressed in a state where the continuous shooting function is enabled. The mode in which the continuous shooting function is enabled is the continuous shooting mode.

When the user presses down a moving image shooting button of the operation device 104 in the moving image shooting mode, the image pickup apparatus 100 shoots a moving image. In the moving image shooting mode, the image processor 113 performs image processing on continuous moving image data shot by the image pickup circuit 112, and the encoding processor 114 performs encoding processing as a moving image on the moving image data having been subjected to the image processing. Then, the recording medium controller 119 records the encoded moving image data in the recording medium 120 as a file.

In the shooting standby state, the image pickup circuit 112 shoots an image at a predetermined frame rate, and the image processor 113 performs, on the image, image processing for display. Then, the display controller 115 causes the display 116 to display the image data having been subjected to the image processing for display. Thus, a live view image is displayed. In the reproduction mode, the recording medium controller 119 reads an image file stored in the recording medium 120, and the encoding processor 114 decodes image data of the image file having been read. Then, the image processor 113 performs on the image data the processing for display, and the display controller 115 causes the display 116 to display the image data.

Figure 3:
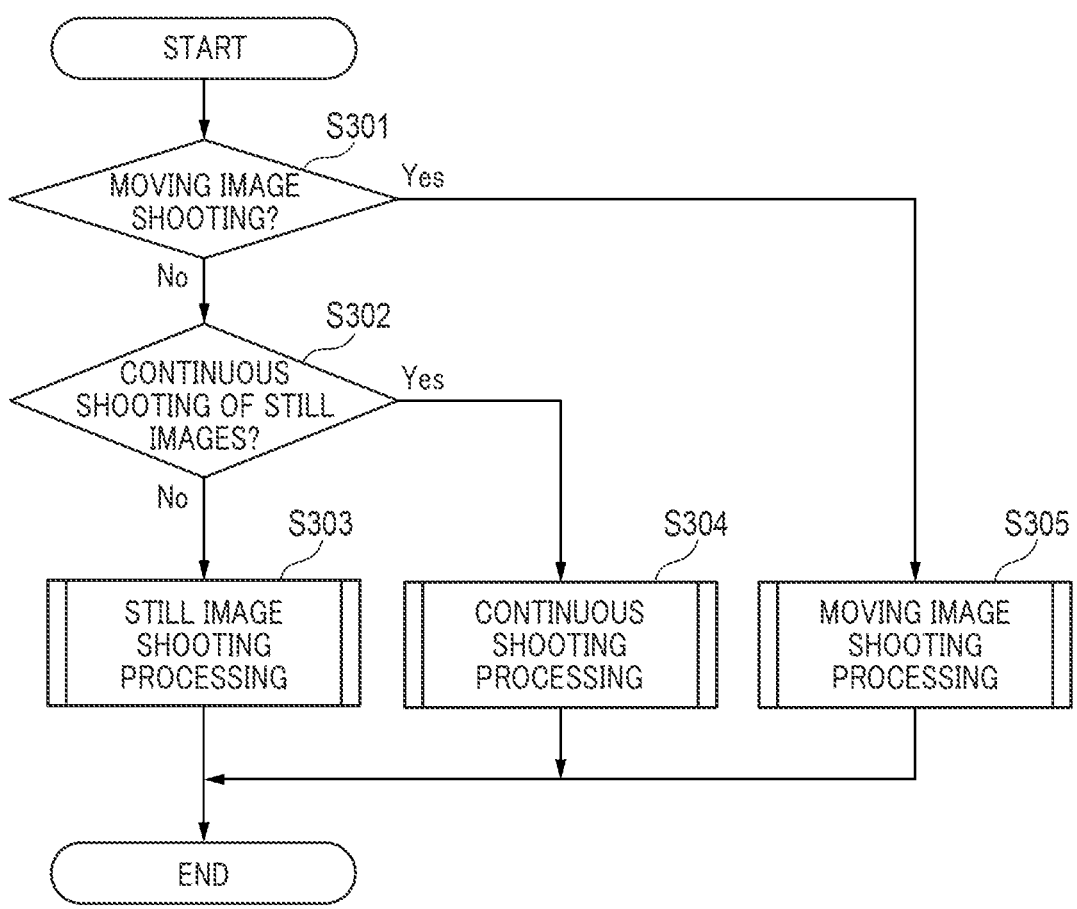
FIG. 3 is a flowchart showing an overall processing flow.

Next, the overall processing performed by the neural network processor 105 will be described. FIG. 3 is a flowchart showing an overall processing flow performed by the neural network processor 105. When the user performs on the image pickup apparatus 100 an operation of turning on the power of the image pickup apparatus 100, the power of the image pickup apparatus 100 is turned on. Then, a computer program stored in the nonvolatile memory 103 is expanded in the memory 102, and the CPU 101 reads and executes the computer program expanded in the memory 102. The CPU 101 causes the image pickup circuit 112 to shoot an image at a predetermined frame rate, and causes the display 116 to start displaying a live view image.

The CPU 101 determines whether the mode switching switch of the operation device 104 is set to the moving image shooting mode (S301). When the determination is No in S301, the CPU 101 determines whether the continuous shooting mode is set (S302). The CPU 101 performs determination of S302 based on the information stored in the memory 102 as to whether the continuous shooting function is enabled or disabled. When the determination is No in S302, the CPU 101 performs control so as to execute the still image shooting processing (S303). When the determination is Yes in S302, the CPU 101 performs control so as to execute the continuous shooting processing (S304). When the determination is Yes in S301, the CPU 101 performs control so as to execute moving image shooting (S305). Details of the still image shooting processing, the continuous shooting processing, and the moving image shooting processing will be described later.

Figure 4:
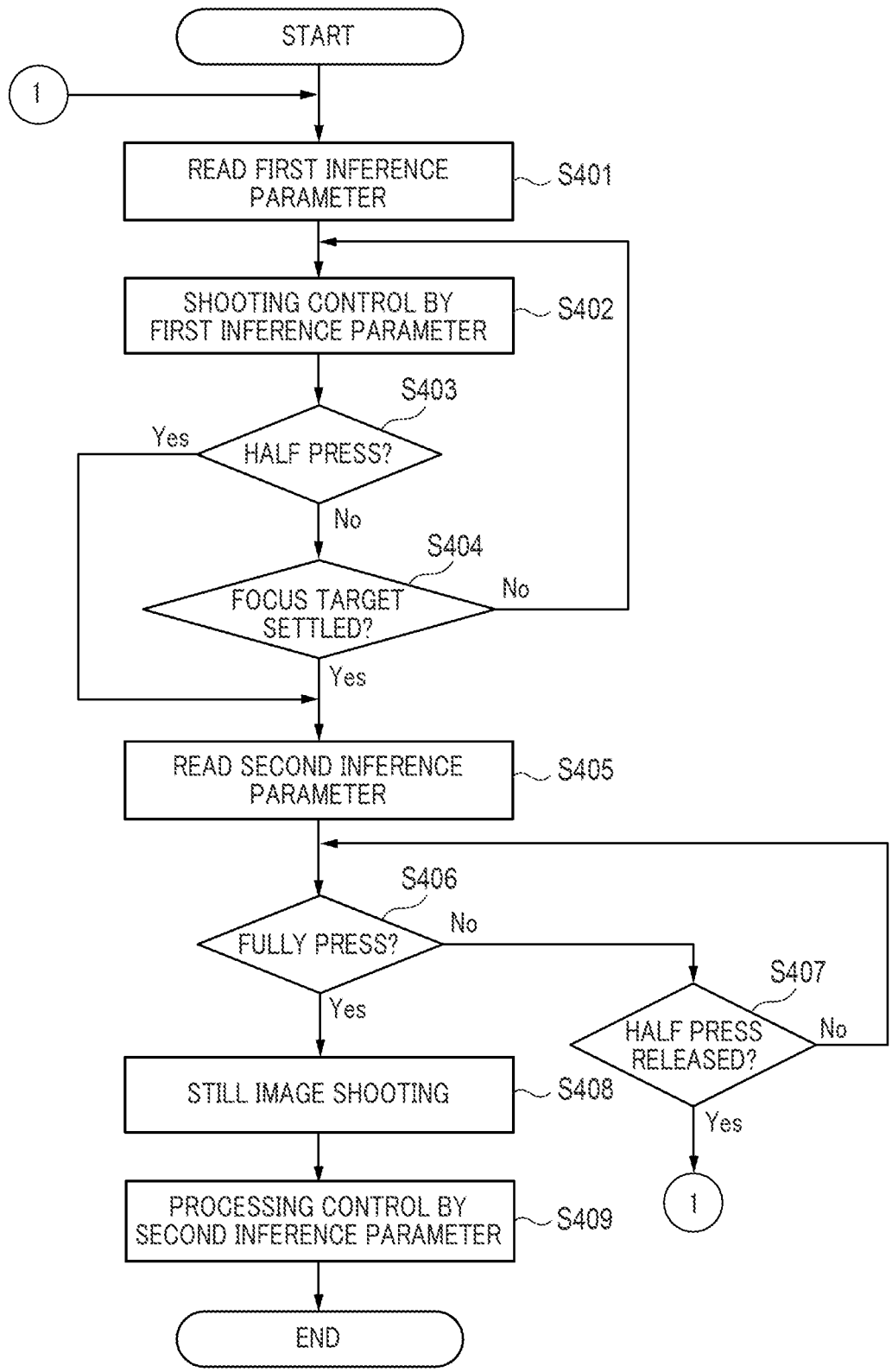
FIG. 4 is a flowchart showing a flow of still image shooting processing.

Next, the still image shooting processing in S303 will be described. FIG. 4 is a flowchart showing the flow of the still image shooting processing. The CPU 101 notifies the CPU 141 of a first inference parameter read from the memory 102. Upon receiving the notification, the CPU 141 controls the DMA 143 to read the first inference parameter (S401). The first inference parameter having been read is stored in the internal memory 144. Thus, the first inference parameter is set in the neural core 140. The first inference parameter is a machine learned coefficient parameter used when applying a neural network for shooting control.

The CPU 101 notifies the CPU 141 of causing the processing of the neural network using the first inference parameter to be executed. With a live view image as an input, the CPU 141 causes the multiply-accumulate operation circuit 142 to execute multiply-accumulate operation processing, and performs processing of the neural network to which the first inference parameter is applied. Thus, image analysis processing using the first inference parameter is performed as processing for shooting control (S402). The analysis processing using the first inference parameter includes determination of the shooting mode and detection of the subject (human body and object). The processing for shooting control using the first inference parameter may be other processing for setting the shooting parameter. By performing S402, the shooting mode of a still image such as a portrait mode or a landscape mode is determined, and the subject is detected. The processing result of S402 is displayed on the display 116.

Next, the CPU 101 determines whether the release button of the operation device 104 is half pressed and the focus target has been settled (S403). When the determination is Yes in S403, the image pickup apparatus 100 has received a shooting preparation instruction. In this case, the flow transitions to S405 described later. When the determination is No in S403, the CPU 101 determines whether the focus target has been settled even when the release button has not been half pressed (S404). For example, in the case where the display 116 is a touch screen display, the focus target can be settled when the display 116 is touched by the user. Alternatively, the focus target may be automatically settled by analysis processing using the first inference parameter. When the determination is No in S404, the flow returns to S402.

When the determination is Yes in S403 or when the determination is Yes in S404, the CPU 101 notifies the CPU 141 of a second inference parameter read from the memory 102. Upon receiving the notification, the CPU 141 controls the DMA 143 to read the second inference parameter (S405). The second inference parameter having been read is stored in the internal memory 144. Thus, the inference parameter set in the neural core 140 is switched from the first inference parameter to the second inference parameter. The second inference parameter is a machine learned coefficient parameter used when applying the neural network for image processing control.

The CPU 101 determines whether the release button of the operation device 104 has been fully pressed (S406). When the determination is No in S406, it is determined whether the release button has been released (whether the half pressing has been released) or whether the settlement of the focus target has been released (S407). It should be noted that when the release button is released or the settlement of the focus target is released, the flow returns to S401. In this case, the inference parameter having been set in the neural core 140 is switched in S401 from the second inference parameter to the first inference parameter. When neither, the flow returns to S406, where the release button of the operation device 104 is fully pressed, and the flow waits until shooting is executed.

When the determination is Yes in S406, the CPU 101 shoots a still image (S408). Furthermore, the CPU 101 notifies the CPU 141 of the second inference parameter read from the memory 102. With the image shot in S408 as an input, the CPU 141 causes the multiply-accumulate operation circuit 142 to execute the multiply-accumulate operation processing to perform the processing of the neural network to which the second inference parameter is applied. Thus, neural network processing using the second inference parameter is performed as processing for image processing control (S409). The neural network processing using the second inference parameter includes image filtering processing, image recovery processing, super-resolution processing, development processing, and processing of a part of the encoding processor 114. By performing S407, for example, image recovery processing of an image is performed. The processing result of the neural network processing using the second inference parameter can be output to the recording medium controller 119. Thus, the image having been subjected to development processing is recorded on the recording medium 120.

In this manner, the first inference parameter is set in the neural core 140 before the focus target is settled. Then, the neural core 140 performs neural network processing using the first inference parameter. Then, in response to the settlement of the focus target, the inference parameter having been set in the neural core 140 is switched from the first inference parameter to the second inference parameter. Thus, the neural core 140 can perform the neural network processing using the second inference parameter. Here, after the release button of the operation device 104 is fully pressed, the inference parameter having been set in the neural core 140 is to be switched from the first inference parameter to the second inference parameter. In this case, the processing for the switching takes time, and the start of the neural network processing using the second inference parameter is delayed. In general, the shooting mode or the focus target subject is unlikely to change after the focus target for still image shooting is settled. Therefore, even when the inference parameter having been set in the neural core 140 is switched to the second inference parameter in response to the settlement of the focus target, the influence on the shooting control is small. In this manner, the neural network processing using the second inference parameter can be started immediately after shooting the still image. As described above, the neural network applied to the image can be efficiently switched in accordance with the flowchart for still image shooting.

Figure 5:
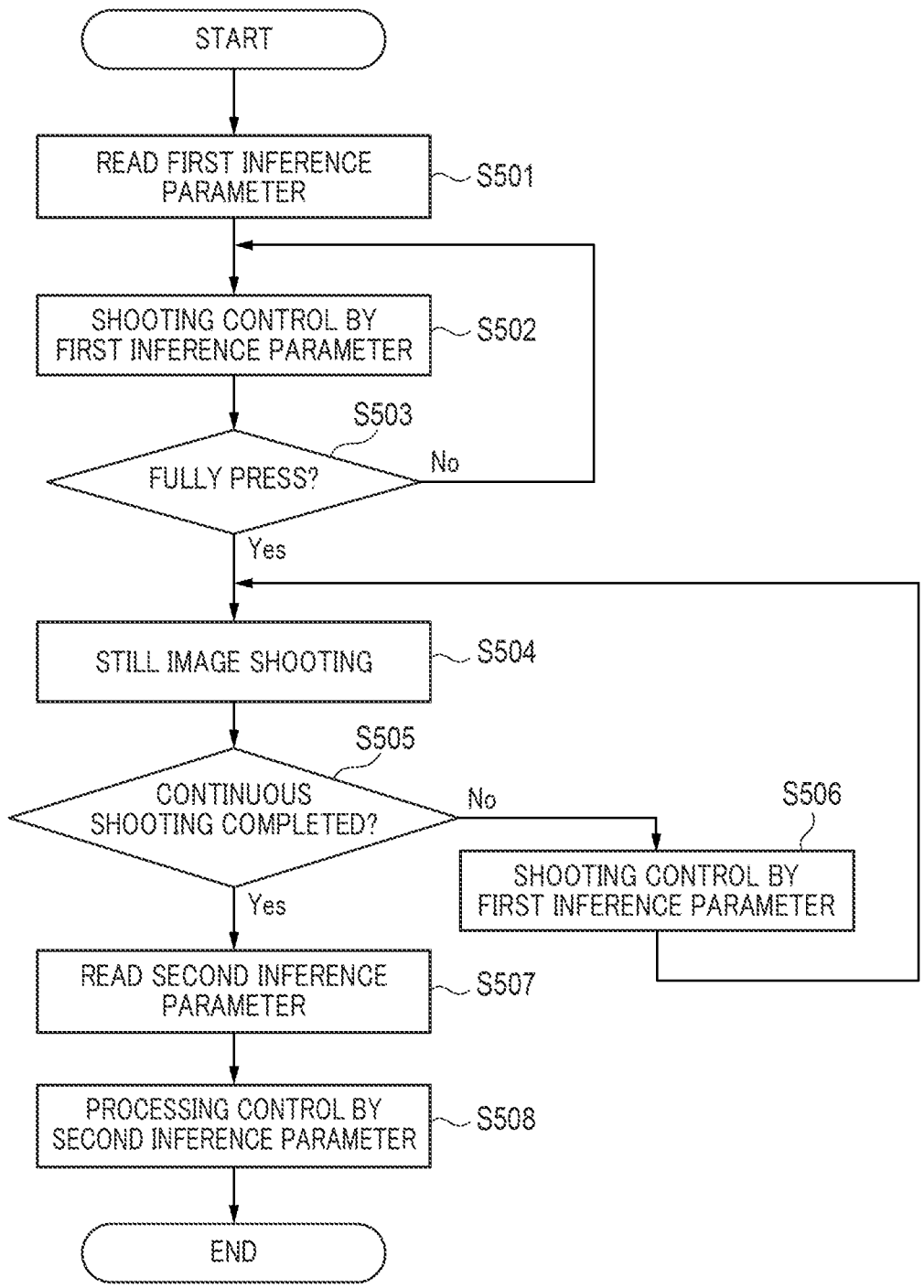
FIG. 5 is a flowchart showing a flow of continuous shooting processing.

Next, the continuous shooting processing in S304 of FIG. 3 will be described. FIG. 5 is a flowchart showing the flow of the continuous shooting processing. The continuous shooting processing is executed when the continuous shooting mode has been set. First, the neural core 140 reads the first inference parameter in response to the notification from the CPU 101 (S501). The processing in S501 is the same as the processing in S401. In addition, the neural core 140 performs neural network processing using the first inference parameter as processing for shooting control (S502). The processing in S502 is the same as the processing in S402. In the continuous shooting processing, the neural network processing using the first inference parameter is continued even when the release button of the operation device 104 is half pressed.

The CPU 101 determines whether the release button of the operation device 104 has been fully pressed (S503). When the release button is not fully pressed (when the determination is No in S503), the process flow returns to S502.

When the determination is Yes in S503, the CPU 101 shoots a still image (S504). It should be noted that in the continuous shooting mode, all the images shot by the image pickup apparatus 100 are temporarily stored in the memory 102 or the recording medium 120.

Furthermore, the CPU 101 determines whether or not the continuous shooting has been completed (S505). The CPU 101 determines that the user has instructed the completion of the continuous shooting when the full pressing of the release button of the operation device 104 has been released, and determines that the continuous shooting is continued when the release button of the operation device 104 has not been released.

When the determination is No in S505, after the neural network processing using the first inference parameter is performed (S506), the next still image shooting is performed (S504).

When the determination is Yes in S505, the CPU 101 notifies the neural core 140 of the second inference parameter. Then, the neural core 140 reads the second inference parameter (S507). The processing in S507 is the same as that in S405. Thus, the inference parameter set in the neural core 140 is switched from the first inference parameter to the second inference parameter. Then, the neural core 140 performs the neural network processing using the second inference parameter as processing for image processing control (S508). The processing in S508 is the same as the processing in S409. It should be noted that in the continuous shooting processing, the CPU 101 erases the still image having been subjected to the processing of S508 from the memory 102 or the recording medium 120. When the CPU 101 executes the processing of S508 for all the still images temporarily stored in the memory 102 or the recording medium 120, the processing ends.

In the case where the continuous shooting mode is set, until the continuous shooting ends, the neural core 140 performs, as processing for shooting control, the neural network processing using the first inference parameter for a plurality of still images to be continuously shot. Then, the first inference parameter having been set in the neural core 140 is switched to the second inference parameter in response to the end of the continuous shooting. The neural core 140 performs, on the still images, the neural network processing using the second inference parameter. When the subject is a moving object, it is desirable to detect the subject by using continuously shot still images or a live view image between the still images so that the image pickup apparatus 100 does not lose sight of the position of the subject. Hence, in the continuous shooting mode, even when the start of the neural network processing using the second inference parameter is slightly delayed, the first inference parameter is set in the neural core 140 until the continuous shooting ends.

Figure 6:
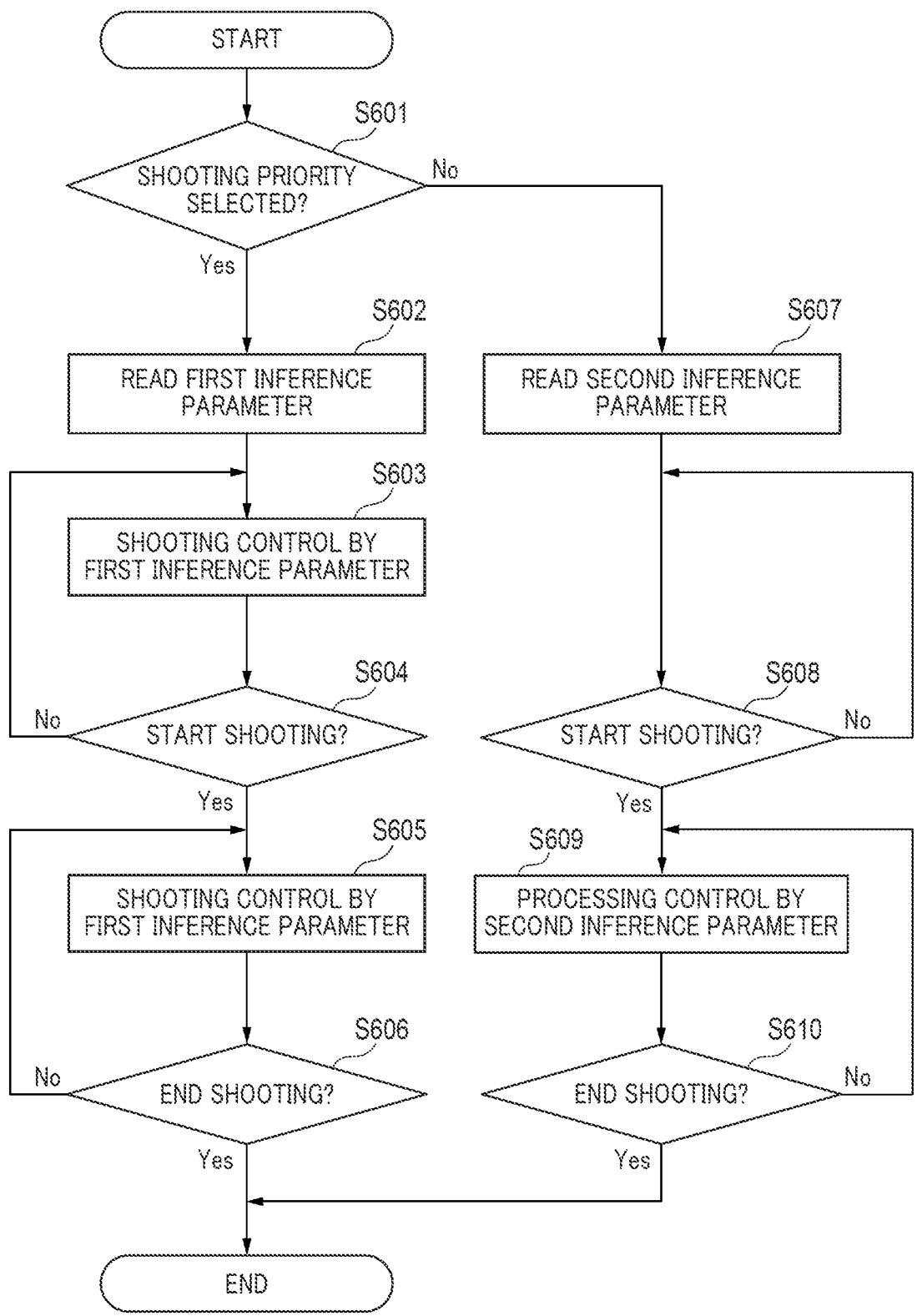
FIG. 6 is a flowchart showing a flow of moving image shooting processing.

Next, the moving image shooting processing in S305 of FIG. 3 will be described. FIG. 6 is a flowchart showing the flow of the moving image shooting processing. The CPU 101 determines which of the processing for shooting control or the processing for image processing control for the neural core 140 to execute (S601). The determination in S601 may be performed in accordance with the selection by the user. Although details of the determination in S601 will be described later, it is determined that the processing for shooting control is selected if the user selects shooting priority as the AI priority mode, and it is determined that the processing for image processing control is selected when the user selects recording priority as the AI priority mode. When it is determined in S601 that the "processing for shooting control" is selected, the CPU 101 notifies the neural core 140 of the first inference parameter. Then, the neural core 140 reads the first inference parameter (S602). The neural core 140 performs neural network processing using the first inference parameter as processing for shooting control (S603). The processing in S603 is the same as that in S402. The CPU 101 determines whether the moving image shooting has started (S604).

When the determination is No in S604, the flow returns to S603. When the determination is Yes in S604, the neural core 140 performs the neural network processing using the first inference parameter as processing for shooting control during moving image shooting (S605).

The CPU 101 determines whether the moving image shooting has ended (S606). Whether the shooting has ended can be determined based on whether the shooting by the moving image shooting button of the operation device 104 is continued. When the determination is No in S606, the flow returns to S605. When the determination is Yes in S606, the processing ends.

When it is determined in S601 that the "processing for image processing control" is selected, the CPU 101 notifies the neural core 140 of the second inference parameter. Then, the neural core 140 reads the second inference parameter (S607). The CPU 101 determines whether the moving image shooting has started (S608).

The flow waits until the determination becomes Yes when it is No in S608, and the flow proceeds to S609 when it is Yes in S608. The neural core 140 performs the neural network processing using the second inference parameter as processing for image processing control during moving image shooting (S609). The processing in S609 is the same as that in S409.

The CPU 101 determines whether the moving image shooting has ended (S610). The determination of S610 is the same as the determination of S606. When the determination is No in S610, the flow returns to S609. When the determination is Yes in S610, the processing ends.

As described above, in the moving image shooting processing, either the processing of the neural network using the first inference parameter or the processing of the neural network using the second inference parameter is performed. Since the operation amount of the multiply-accumulate operation in the processing of the neural network is large, the processing of the neural network for one image requires a certain amount of time. On the other hand, in the moving image shooting, images are sequentially acquired in accordance with the frame rate. Accordingly, it is difficult for one neural core 140 to apply both the processing of the neural network using the first inference parameter and the processing of the neural network using the second inference parameter to each image acquired at high speed. Therefore, in the case where the moving image shooting mode is set, whether to apply the neural network processing to the pre-exposure processing or to apply the neural network processing to the post-exposure processing is selected by the user or the like.

Figure 7A:
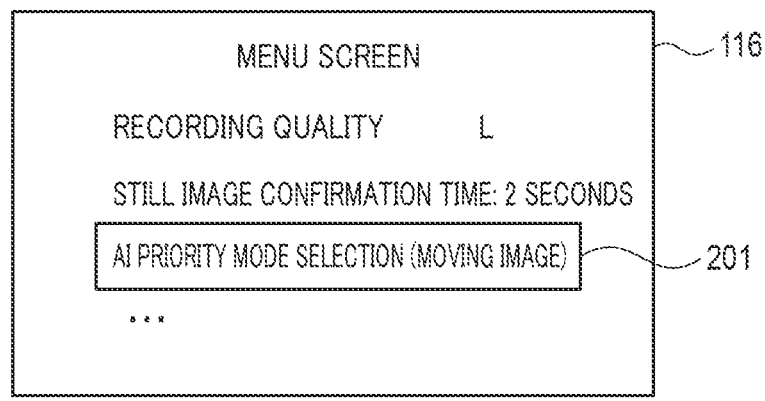
FIG. 7A is an example of a menu screen.
Figure 7B:
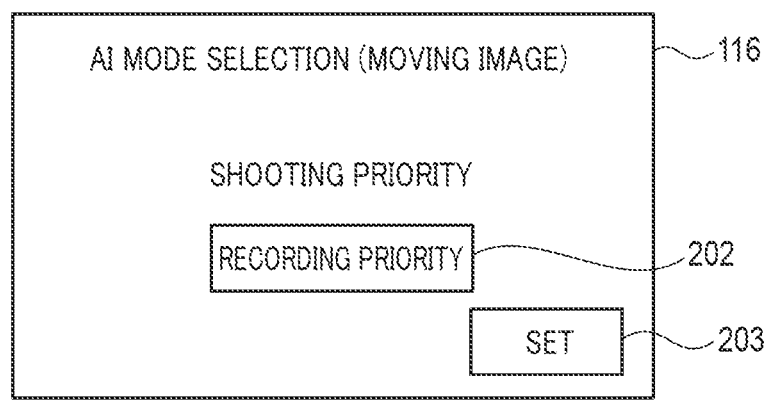
FIG. 7B is an example of a selection screen.

FIG. 7 is diagrams showing examples of screens for selecting the priority mode. FIG. 7A is the menu screen, which is a screen displayed on the display 116. The menu screen has a plurality of items. By operating the operation device 104 and moving a cursor 201, the user can select an item to change the setting. In the case where the display 116 is a touch screen display, the user may perform a selection operation on the display 116. It is assumed that an operation of selecting "AI priority mode selection (moving image)" has been performed on the menu screen of FIG. 7A. In response to the operation, the display controller 115 causes the display 116 to display the selection screen shown in FIG. 7B.

The selection screen of FIG. 7B is a screen for selecting one of "shooting priority" and "recording priority". By operating a cursor 202 to the operation device 104 or the display 116, the user can select one of "shooting priority" and "recording priority". The "shooting priority" is an item selected when the neural network processing is applied for shooting control. The "recording priority" is an item selected when the neural network processing is applied for image processing control. When a set button 203 is pressed down in a state where any of the items is selected, the CPU 101 recognizes which to apply the neural network processing to the processing for shooting control and the processing for image processing control. Thus, the CPU 101 can perform the determination in S601. The determination in S601 may be performed by a method other than the selection using the screen example of FIG. 7. For example, when there is no instruction from the user, the CPU 101 may also determine that the neural network processing is applied to the processing for shooting control as an initial value. Furthermore, the CPU 101 may also determine that the neural network processing is applied to the process lastly instructed by the user of the processing for shooting control and the processing for image processing control.

In addition, the operation amount of the neural network processing using the first inference parameter applied at the time of moving image shooting may be smaller than the operation amount of the neural network processing using the first inference parameter applied at the time of still image shooting. In this case, the first inference parameter used for moving image shooting and the first inference parameter used for still image shooting are stored in the memory 102 or the recording medium 120. As described above, in moving image shooting, an image is acquired at a predetermined frame rate. For this reason, in the case of moving image shooting, it is necessary to perform neural network processing on the acquired image at high speed. Here, if the operation amount of the first inference parameter at the time of moving image shooting is small, the neural network processing using the first inference parameter can be performed on the image acquired by moving image shooting at a high frame rate. The second inference parameter is also the same as the first inference parameter. That is, the operation amount of the second inference parameter applied at the time of moving image shooting may be smaller than the operation amount of the second inference parameter applied at the time of still image shooting.

Furthermore, the CPU 101 may also select one second inference parameter from a plurality of second inference parameters in accordance with the processing result of the processing of the neural network using the first inference parameter. At this time, the CPU 101 may also select the most appropriate second inference parameter from the second inference parameters in accordance with the processing result of the processing of the neural network using the first inference parameter.

For example, it is assumed that a human body is detected as a subject the portrait mode is determined as a shooting mode, by the neural network processing using the first inference parameter. In this case, the CPU 101 selects, as the second inference parameter, an inference parameter for the filtering processing or the image recovery processing that makes the subject soft and bright. The neural core 140 performs neural network processing using the selected inference parameter. On the other hand, it is assumed that neither a human body nor a specific object is detected and it is determined to be a landscape mode, by the neural network processing using the first inference parameter. In this case, the CPU 101 selects, as the second inference parameter, an inference parameter for the filter processing or the image recovery processing that emphasizes contrast and saturation of the subject.

Furthermore, the memory 102 or the recording medium 120 may also store a third inference parameter in addition to a plurality of types of first inference parameters and second inference parameters. The third inference parameter is a machine learned coefficient parameter used when applying a neural network for reproducing a still image or a moving image. The CPU 101 may also select one third inference parameter from a plurality of types of third inference parameters in accordance with the processing result of the neural network processing using the first inference parameter. The reproduction processing includes, for example, filtering processing of a reproduction image and processing of detecting a specific subject (object or person) from a reproduction image. In addition, the third inference parameter may also be used when a preview image is automatically displayed after the shooting is completed.

As described above, according to the present embodiment, the inference parameter to be set in the neural core 140 is dynamically switched at a timing suitable for each shooting mode. Thus, the neural network to be set in the neural core 140 can be efficiently switched in accordance with the situation.

Second Embodiment

Figure 8:
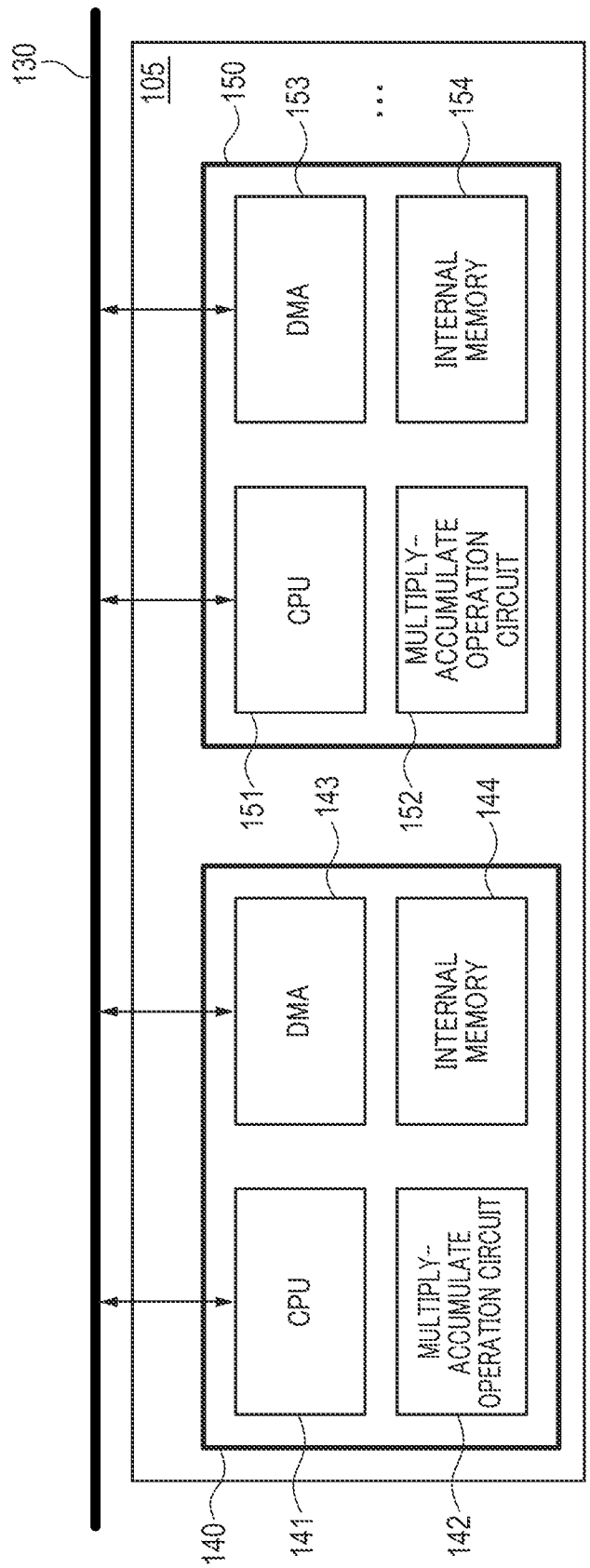
FIG. 8 is a diagram showing the configuration of the neural network processor according to a second embodiment.

Next, the second embodiment will be described. Since the configuration of the image pickup apparatus 100 is the same as that of the first embodiment, a description thereof will be omitted. FIG. 8 is a diagram showing the configuration of the neural network processor 105 according to the second embodiment. The neural network processor 105 has the neural core 140 and a neural core 150. The neural core 140 has a CPU 141, a multiply-accumulate operation circuit 142, a DMA 143, and an internal memory 144. The neural core 150 has a CPU 151, a multiply-accumulate operation circuit 152, a DMA 153, and an internal memory 154.

The neural network processor 105 may also have three or more neural cores 140. Furthermore, in the example of FIG. 8, each of the neural cores has an internal memory, but the neural network processor 105 may also have an internal memory used commonly by each of the neural cores. Moreover, in the second embodiment, the processing of the neural network may also be performed using either the CPU 101 or the GPU of the display controller 115. In the second embodiment, each inference parameter is divided into a plurality of processing units. The processing contents vary depending on the processing unit.

For example, it is assumed that the first inference parameter for shooting control is an inference parameter applied to the processing of the neural network for subject detection and shooting mode determination. In this case, the first inference parameter includes, as a processing unit, a first inference parameter used for subject detection and a first inference parameter used for shooting mode determination. It is also assumed that the second inference parameter for image processing control is an inference parameter applied to image recovery processing and encoding processing. In this case, the second inference parameter includes, as a processing unit, a second inference parameter used for image recovery processing and a second inference parameter used for encoding processing.

The overall processing flow performed by the neural network processor 105 in the second embodiment will be described with reference to the flowchart of FIG. 9. The CPU 101 notifies the CPU 141 and the CPU 151 of the first inference parameter read from the memory 102 separately for each processing unit. Upon receiving the notification, the CPU 141 controls the DMA 143 to read the first inference parameter used for subject detection, and the CPU 151 controls the DMA 153 to read the first inference parameter used for shooting mode determination (S901).

The CPU 101 notifies the CPU 141 and the CPU 151 of causing the processing of the neural network using the first inference parameter to be executed. With a live view image as an input, the CPU 141 and the CPU 151 perform the processing of the neural network to which the first inference parameter is applied (S902).

Next, the CPU 101 determines whether the release button of the operation device 104 is half pressed and the focus target has been settled (S903). When the determination is Yes in S903, the flow transitions to S905. When the determination is No in S903, the CPU 101 determines whether the focus target has been settled even when the release button has not been half pressed (S904). When the determination is No in S904, the flow returns to S902.

When the determination is Yes in S903 or when the determination is Yes in S904, the CPU 101 notifies only the CPU 151 of the second inference parameter read from the memory 102. Upon receiving the notification, the CPU 151 controls the DMA 153 to read the second inference parameter used for the encoding processing (S905). The second inference parameter having been read is stored in the internal memory 154. Thus, the inference parameter set in the neural core 150 is switched from the first inference parameter to the second inference parameter. At this time, the inference parameter set in the neural core 140 remains as the first inference parameter.

With a live view image as an input, the CPU 141 performs the processing of the neural network to which the first inference parameter is applied (S906).

The CPU 101 determines whether the release button of the operation device 104 has been fully pressed (S907). When the determination is No in S907, the CPU 101 determines whether the release button has been released (whether the half pressing has been released) or whether the settlement of the focus target has been released (S908). When the release button is released or the settlement of the focus target is released, the CPU 101 causes the CPU 151 to read the first inference parameter used for the determination of the shooting mode (S909). Then, the processing flow returns to S902. When the release button is released or the settlement of the focus target is released, it is unlikely that a still image is immediately shot, and hence the shooting control by the first inference parameter can be performed by the two neural cores. On the contrary, when the determination is No in S908, the flow returns to S906.

When the determination is Yes in S907, the CPU 101 shoots a still image (S910). Furthermore, with the image shot in S910 as an input, the CPU 151 performs the processing of the neural network to which the second inference parameter is applied. Thus, neural network processing using the second inference parameter is performed as processing for image processing control (S911).

In this manner, the first inference parameter is set in both the neural core 140 and the neural core 150 before the focus target is settled. Then, in response to the settlement of the target of focus that is a predetermined condition, only the inference parameter having been set in the neural core 150 is switched from the first inference parameter to the second inference parameter. Therefore, the neural core 150 can perform the neural network processing using the second inference parameter. Thus, the neural network processing using the second inference parameter can be started immediately after shooting the still image.

Here, the inference parameter set in the neural core 140 remains as the first inference parameter. Therefore, the processing speed becomes lower than that before the focus target is settled, but after the focus target is settled, the neural network processing using the first inference parameter can be performed with the live view image as an input. It should be noted that although the first inference parameter is notified to the CPU 141 and the CPU 151 separately for each processing unit here, the same first inference parameter may be notified to the CPU 141 and the CPU 151.

After S905, the CPU 101 may cause the display 116 to display information indicating that the processing speed of the neural network using the first inference parameter has been decreasing. As described above, in the stage of S902, the two neural cores of the neural core 140 and the neural core 150 perform the neural network processing using the first inference parameter. On the other hand, in the stage of S906, the neural core 150 performs the neural network processing using the first inference parameter, but the neural core 150 is switched to the second inference parameter and waits until a still image is shot. Accordingly, the processing speed of the neural network processing using the first inference parameter becomes slower in the stage of S906 than in the stage of S902. The display of the above information makes the user less likely to have a feeling of strangeness about the slowing of the speed of subject detection and shooting mode determination.

Figure 9:
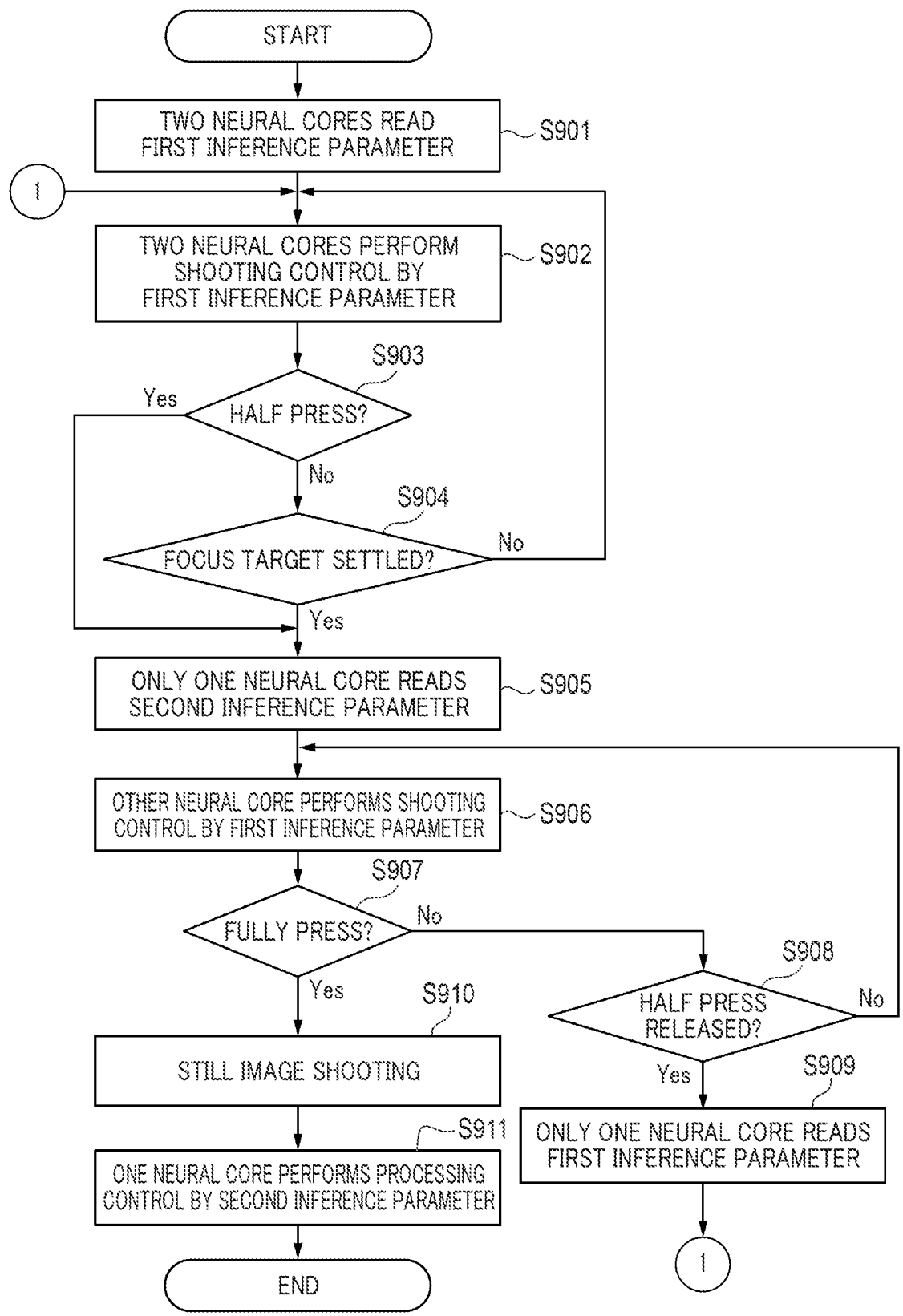
FIG. 9 is a flowchart showing the flow of the still image shooting processing according to the second embodiment.
Figure 10:
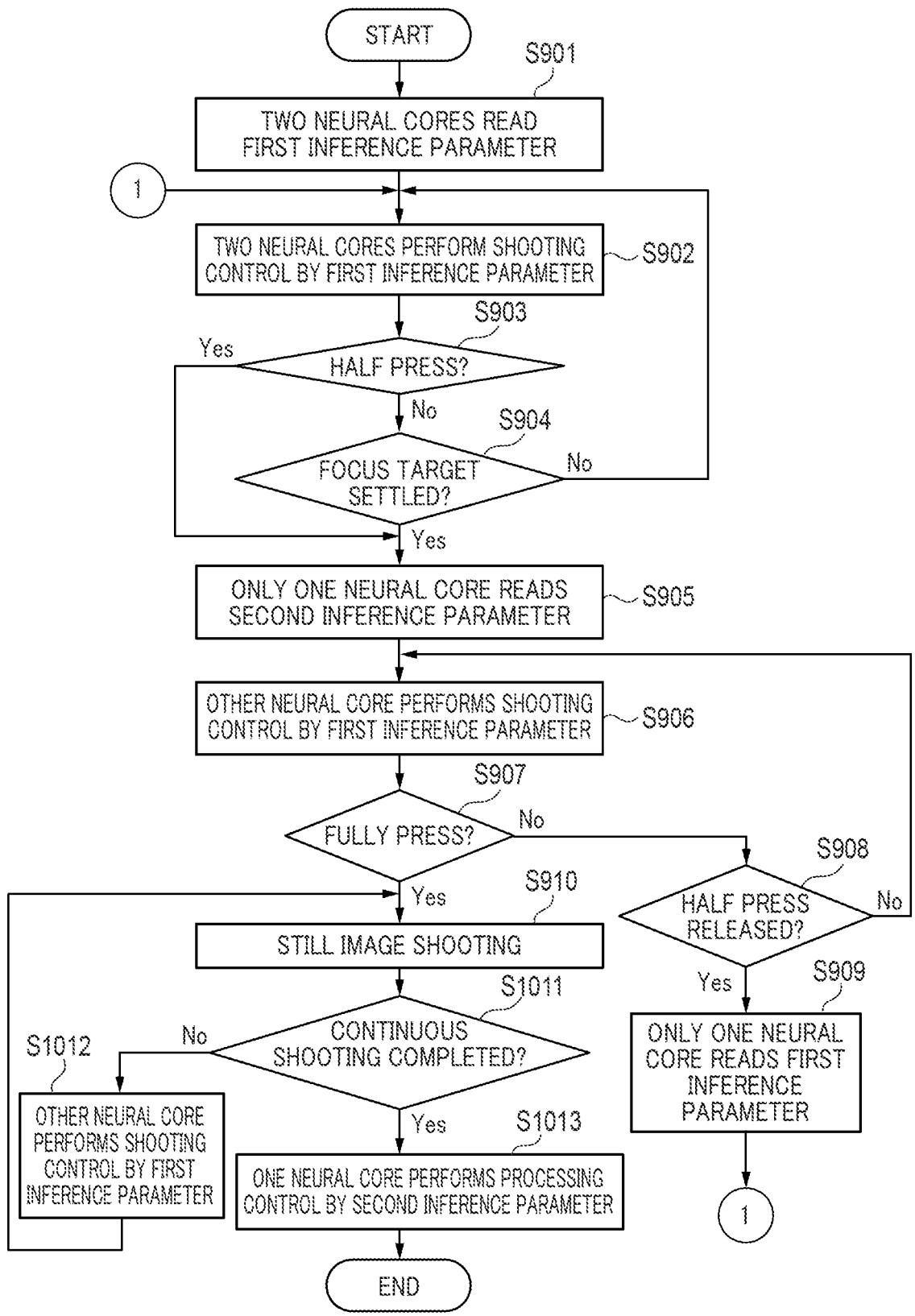
FIG. 10 is a flowchart showing the flow of the continuous shooting processing according to the second embodiment.

It should be noted that the flowchart of FIG. 9 can also be used in continuous shooting processing. FIG. 10 is a flowchart of the continuous shooting processing. In the continuous shooting processing of FIG. 10, the same processing as the still image shooting processing of FIG. 9 is performed up to S910. When the determination is Yes in S907 and the CPU 101 shoots a still image in S910, the CPU 101 determines whether the continuous shooting has been completed (S1011). It should be noted that all the still images shot by the image pickup apparatus 100 are temporarily stored in the memory 102 or the recording medium 120.

When the determination is No in S1011, the CPU 141, with the still image or the live view image obtained after the still image as an input, performs the processing of the neural network to which the first inference parameter is applied (S1012), and then performs the next still image shooting (S910).

When the determination is Yes in S1011, with the image shot in S910 as an input, the CPU 151 performs the processing of the neural network to which the second inference parameter is applied. Thus, neural network processing using the second inference parameter is performed as processing for image processing control (S1013). When the CPU 101 executes the processing of S1013 for all the still images temporarily stored in the memory 102 or the recording medium 120, the processing ends.

Figure 11:
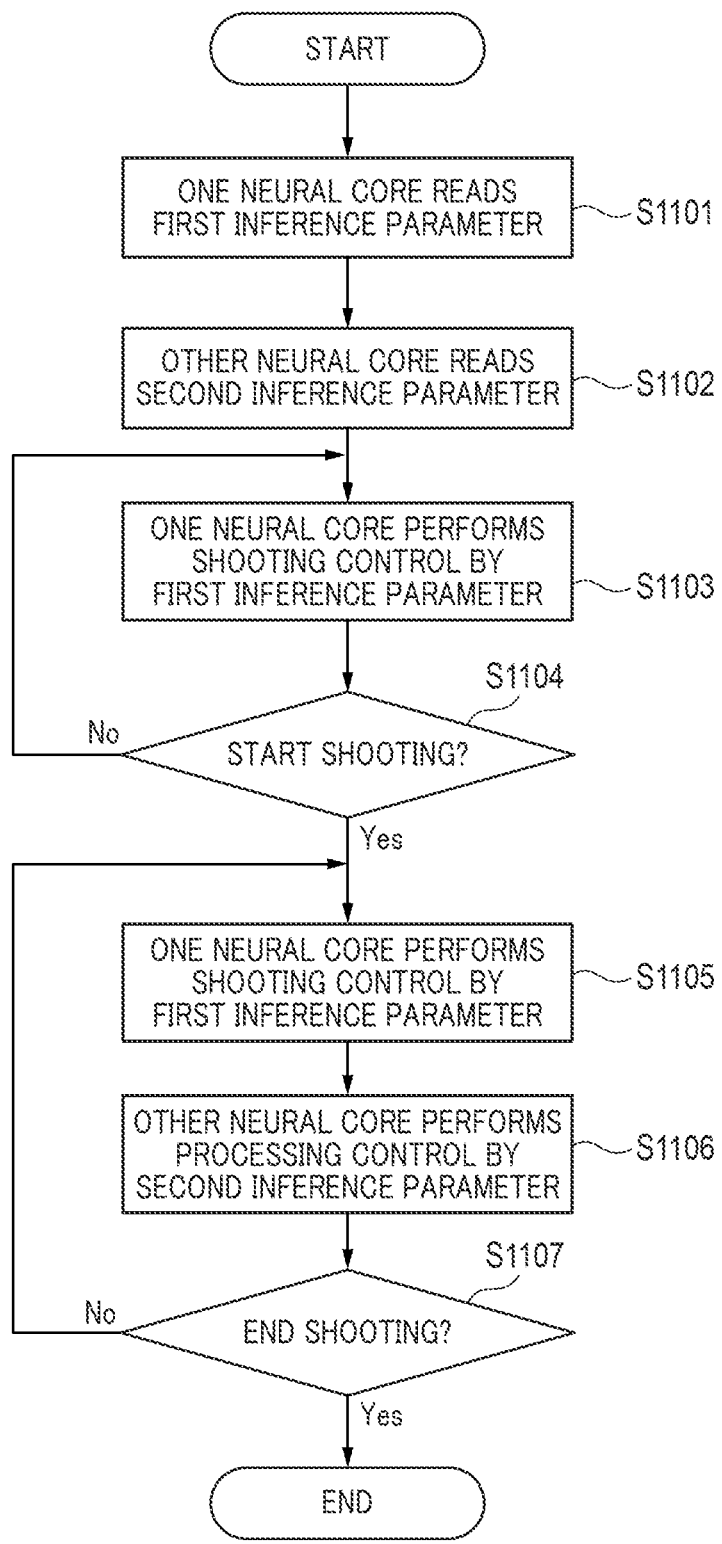
FIG. 11 is a flowchart showing the flow of the moving image shooting processing according to the second embodiment.

Next, the moving image shooting processing of the second embodiment will be described with reference to FIG. 11. The CPU 101 notifies the neural core 140 of the first inference parameter and notifies the neural core 150 of the second inference parameter. The neural core 140 corresponds to one or more processing units, and the neural core 150 corresponds to other processing units. The neural core 140 reads the first inference parameter (S1101). Thus, the first inference parameter is set in the neural core 140. Furthermore, the neural core 150 reads the second inference parameter (S1102). Thus, the second inference parameter is set in the neural core 150. S1102 may be performed prior to S1101, or S1101 and S1102 may be performed at the same time.

Based on the notification from the CPU 101, the neural core 140 performs the neural network processing (processing for shooting control) using the first inference parameter with the live view image as an input image (S1103).

When the moving image shooting is started (S1104), the neural core 140 performs the neural network processing (processing for shooting control) using the first inference parameter with each frame image of the moving image as an input image (S1105). Furthermore, the neural core 150 performs the neural network processing (processing for image processing control) using the second inference parameter with each frame image of the moving image as an input image (S1106). S1106 may be performed prior to S1105, or S1105 and S1106 may be performed at the same time. The CPU 101 determines whether there is an instruction to end the shooting (S1107). When the determination is No in S1107, the moving image shooting has not ended, and hence the flow returns to S1105. When the determination is Yes in S1107, the moving image shooting has ended, and hence the processing ends.

In the moving image shooting processing, the neural network processing using the first inference parameter and the neural network processing using the second inference parameter are performed in parallel by using a plurality of neural cores. Thus, in the moving image shooting, processing for shooting control and processing for image processing control can be performed in parallel.

Other Embodiments

In each of the above-described embodiments, the example in which the image pickup apparatus 100 has the CPU 101 and the neural network processor 105 has been described. There is a limit in the circuit scale of the neural core that can be mounted on the image pickup apparatus 100. Accordingly, in the image pickup apparatus 100, the neural core having a small amount of hardware resources can be effectively utilized by performing the control of each of the above-described embodiments. On the other hand, each of the above-described embodiments can be applied not only to the image pickup apparatus 100 but also to a predetermined information processing apparatus.

For example, an edge computer can be applied as the predetermined information processing apparatus. In this case, the edge computer has the functions of the CPU 101 and the neural network processor 105. The image pickup apparatus 100 transmits the shot image to the edge computer via the communicator 118. The edge computer performs the processing of each of the above-described embodiments, and transmits the processing result to the image pickup apparatus 100. Then, the processing result is recorded in the recording medium 120. In this case, the information processing apparatus has functions of an acquisition controller and an output controller. In the case where the image pickup apparatus 100 and the edge computer are capable of high-speed communication, the processing of each of the embodiments may be executed by the edge computer. In addition, the processing of each of the embodiments may be executed by a cloud server or the like instead of the edge computer. Alternatively, the processing of each of the embodiments may be executed by a smart device such as a smartphone.

In addition, as shown in FIG. 1, the image pickup apparatus 100 is capable of communicating with the external device 217. Accordingly, part of the processing of each of the embodiments may be executed by the external device 217. In the case where the image pickup apparatus 100 has the neural network processor 105, each inference parameter may be acquired by the image pickup apparatus 100 from the external device 217 as necessary.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-138934, filed Jul. 29, 2019, which is hereby incorporated by reference herein in its entirety.

What is claimed is:

1. An information processing apparatus, comprising:
  a processor that performs arithmetic processing of a neural network; and
  a controller that is capable of setting, in the processor, a first inference parameter to be applied to processing for shooting control for shooting an image and a second inference parameter to be applied to processing for processing control of the image,
  wherein the controller changes timing of switching the first inference parameter to the second inference parameter in response to a shooting mode.

2. The information processing apparatus according to claim 1,
  wherein the controller switches the first inference parameter to the second inference parameter before start of shooting is instructed in a mode of shooting a still image, and switches the first inference parameter to the second inference parameter after continuous shooting is completed in a mode of continuously shooting a still image.

3. An information processing apparatus, comprising:
  a processor that performs arithmetic processing of a neural network; and
  a controller that is capable of setting, in the processor, a first inference parameter to be applied to processing for shooting control for picking up a still image and a second inference parameter to be applied to processing for processing control of the image,
  wherein the shooting control includes determining a shooting mode for picking up the still image,
  wherein the processing control includes performing image processing on the still image after pickup, and
  wherein the controller switches the first inference parameter having been set in the processor to the second inference parameter before picking up the still image.

4. A control method for an information processing apparatus having a processor that performs arithmetic processing of a neural network, the control method comprising:
  changing timing of switching a first inference parameter to a second inference parameter in response to a shooting mode, the first inference parameter to be applied to processing for shooting control for shooting an image and the second inference parameter to be applied to processing for processing control of the image and being capable of setting, in the processor.

5. A control method for an information processing apparatus having a processor that performs arithmetic processing of a neural network, the control method comprising:
  switching a first inference parameter having been set in the processor to a second inference parameter before picking up a still image, the first inference parameter to be applied to processing for shooting control for picking up the still image and the second inference parameter to be applied to processing for processing control of the image and being capable of setting in the processor,
  wherein the shooting control includes determining a shooting mode for picking up the still image, and
  wherein the processing control includes performing image processing on the still image after pickup.

6. A non-transitory computer-readable storage medium storing a computer-executable program that executes a control method for an information processing apparatus having a processor that performs arithmetic processing of a neural network, the control method comprising:
  changing timing of switching a first inference parameter to a second inference parameter in response to a shooting mode, the first inference parameter to be applied to processing for shooting control for shooting an image and the second inference parameter to be applied to processing for processing control of the image and being capable of setting, in the processor.

7. A non-transitory computer-readable storage medium storing a computer-executable program that executes a control method for an information processing apparatus having a processor that performs arithmetic processing of a neural network, the control method comprising:
  switching a first inference parameter having been set in the processor to a second inference parameter before picking up a still image, the first inference parameter to be applied to processing for shooting control for picking up the still image and the second inference parameter to be applied to processing for processing control of the image and being capable of setting in the processor,
  wherein the shooting control includes determining a shooting mode for picking up the still image, and
  wherein the processing control includes performing image processing on the still image after pickup.

* * * * *